June 29, 1926.
S. N. TEVANDER
1,590,334
BEADING MACHINE FOR CAPS FOR JARS AND CANS
Filed June 4, 1923    7 Sheets-Sheet 2
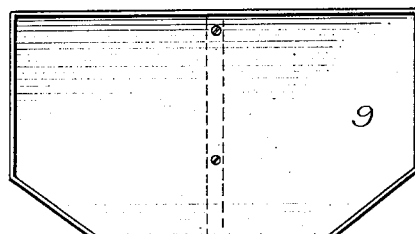
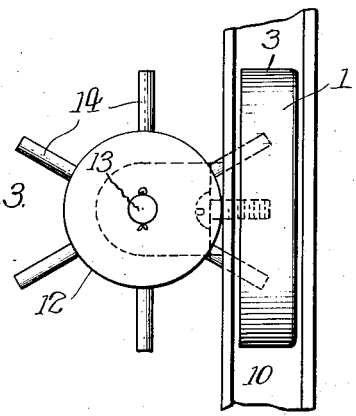
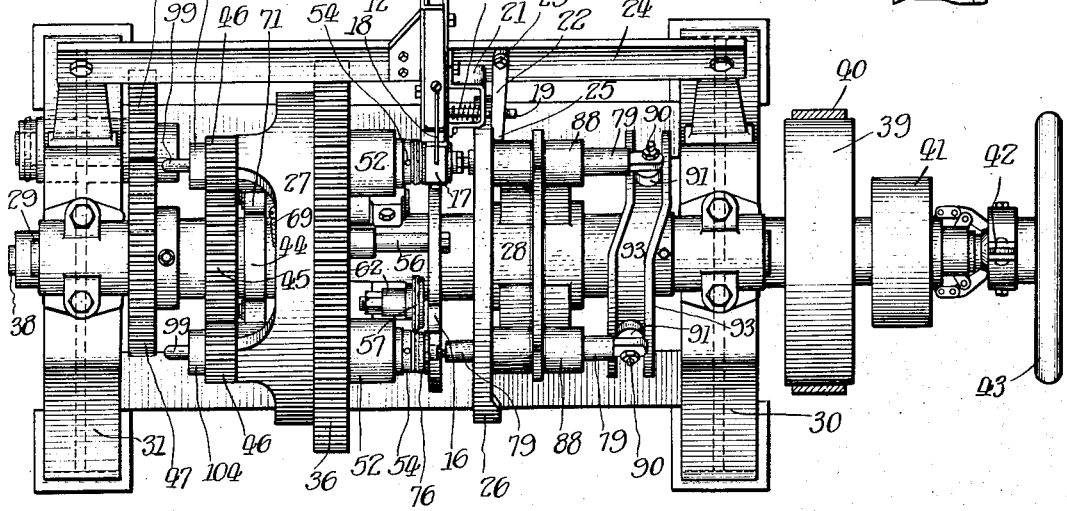
Witness:
A. J. Sauser.
Inventor:
Swan N. Tevander,
By W. E. Williams
Atty.

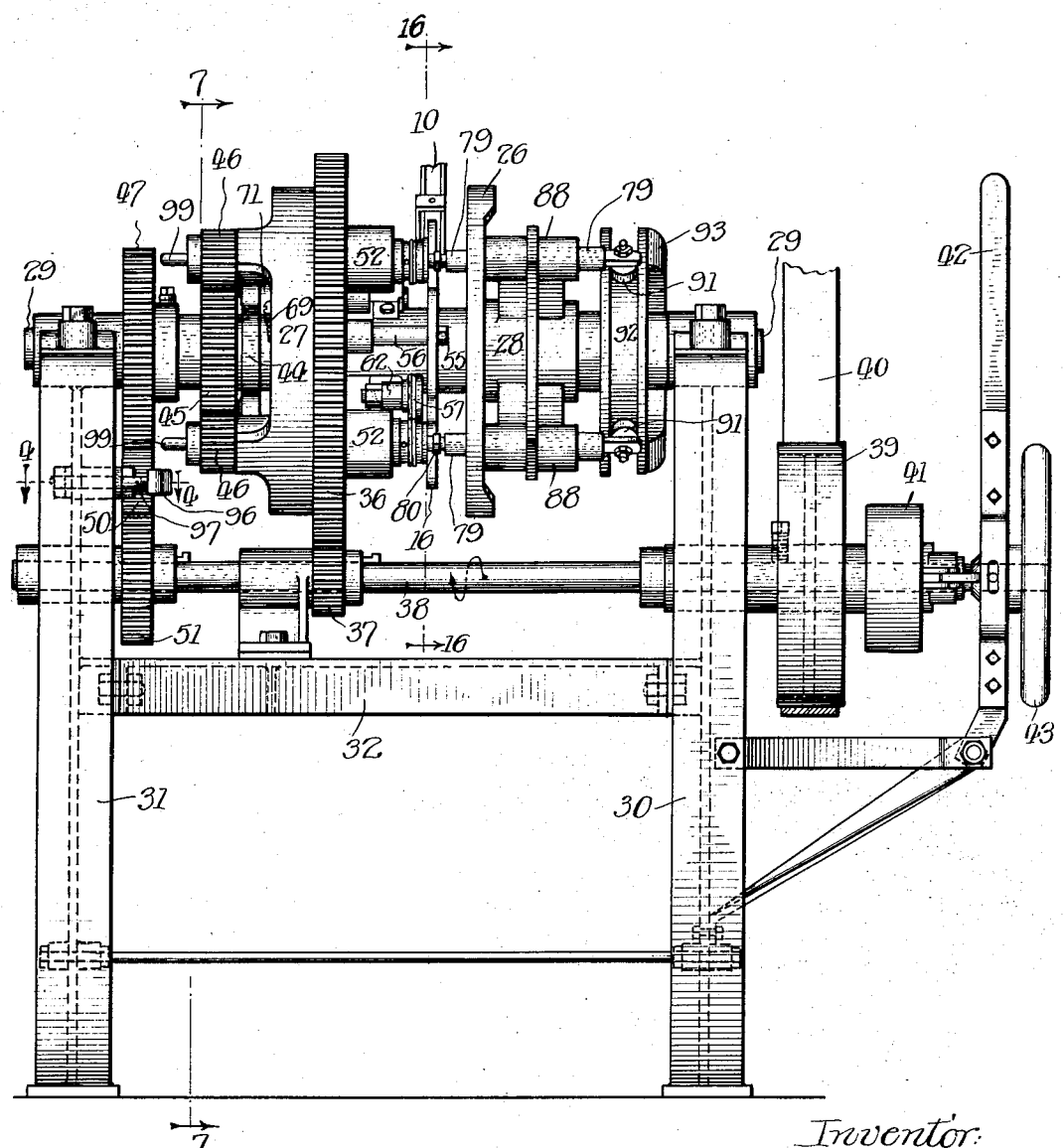

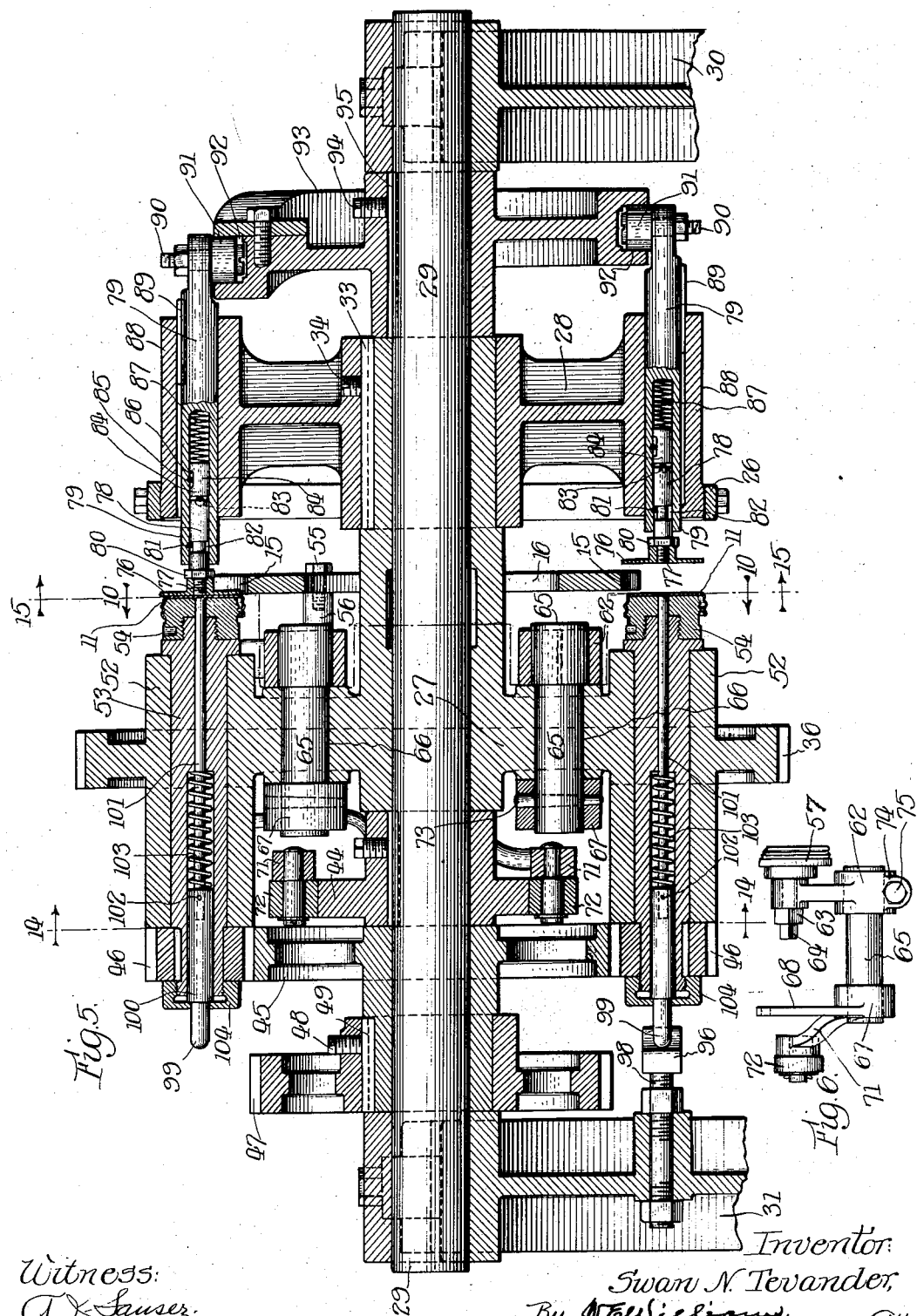

June 29, 1926.
S. N. TEVANDER
1,590,334
BEADING MACHINE FOR CAPS FOR JARS AND CANS
Filed June 4, 1923 7 Sheets-Sheet 4
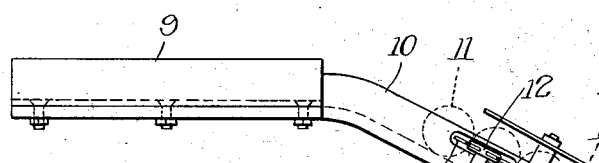
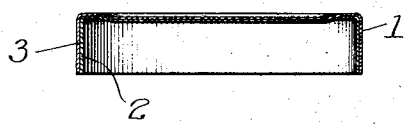
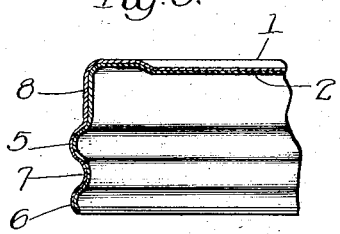
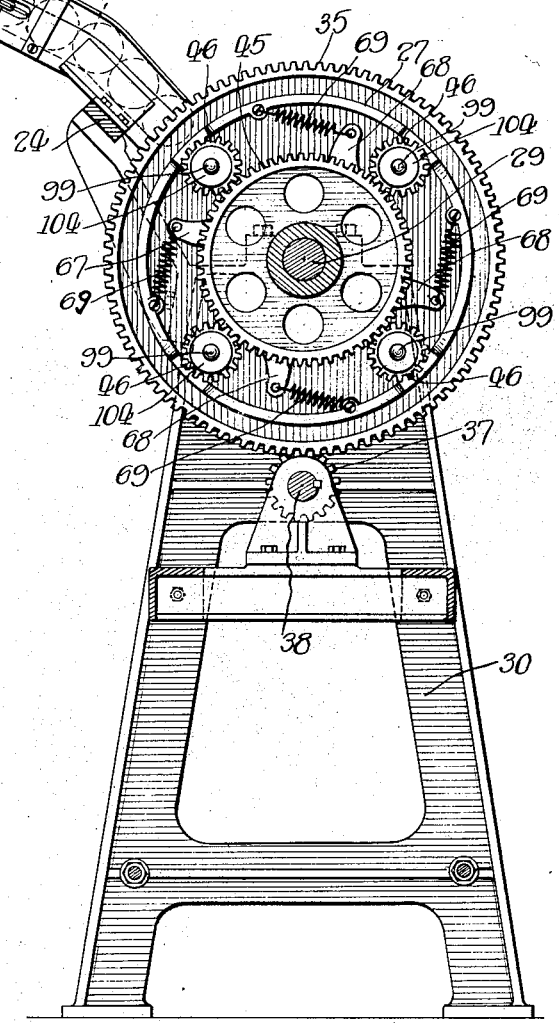
Inventor:
Swan N. Tevander, June 29, 1926. 1,590,334
S. N. TEVANDER
BEADING MACHINE FOR CAPS FOR JARS AND CANS
Filed June 4, 1923 7 Sheets-Sheet 5
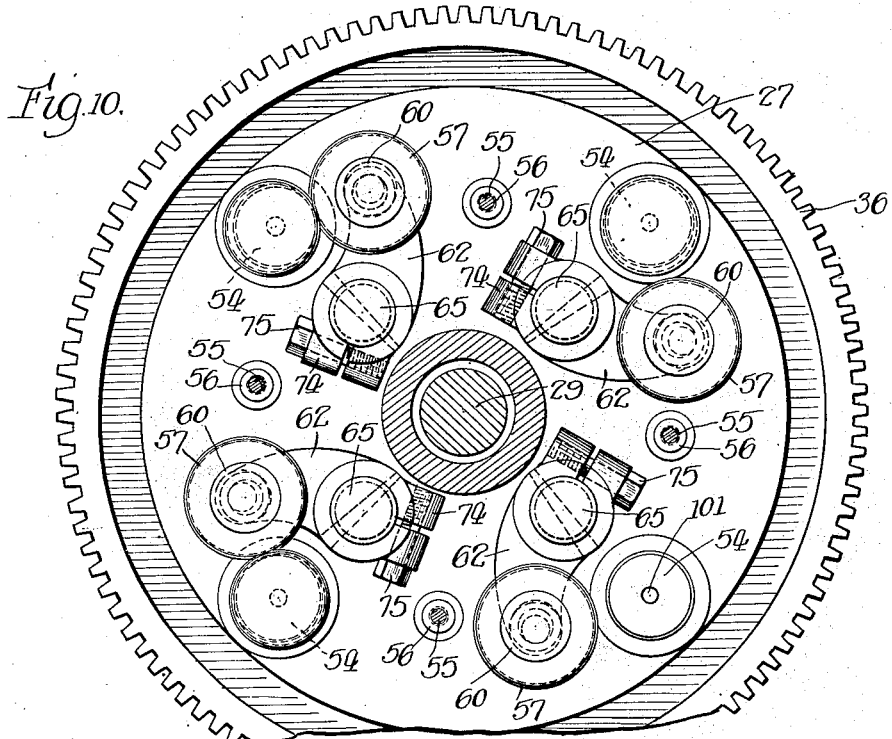
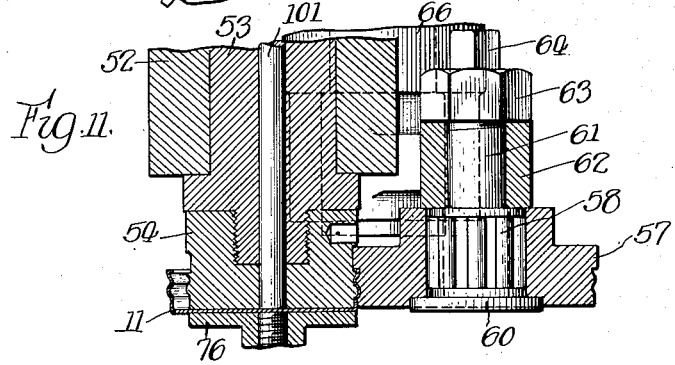
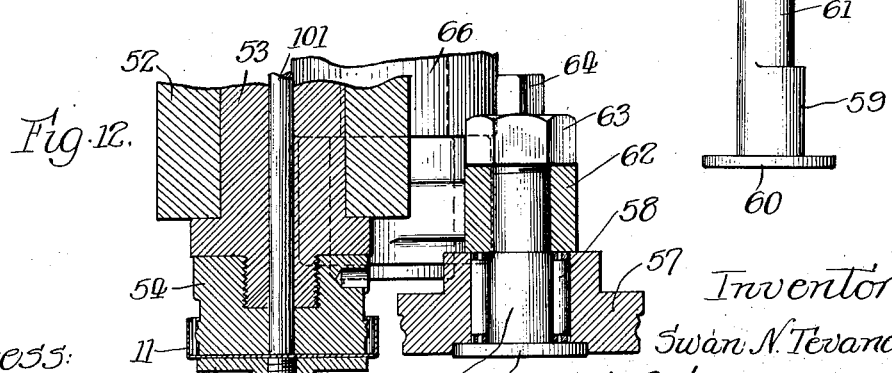
Inventor
Swan N. Tevander,
By W. E. Williams Atty.
Witness:
A. J. Sauser.

June 29, 1926.

S. N. TEVANDER 1,590,334

BEADING MACHINE FOR CAPS FOR JARS AND CANS

Filed June 4, 1923      7 Sheets-Sheet 6

Witness:
C. J. Sauser

Inventor:
Swan N. Tevander,
By W. E. Williams Atty

June 29, 1926.  
S. N. TEVANDER  
1,590,334  
BEADING MACHINE FOR CAPS FOR JARS AND CANS  
Filed June 4, 1923  7 Sheets-Sheet 7
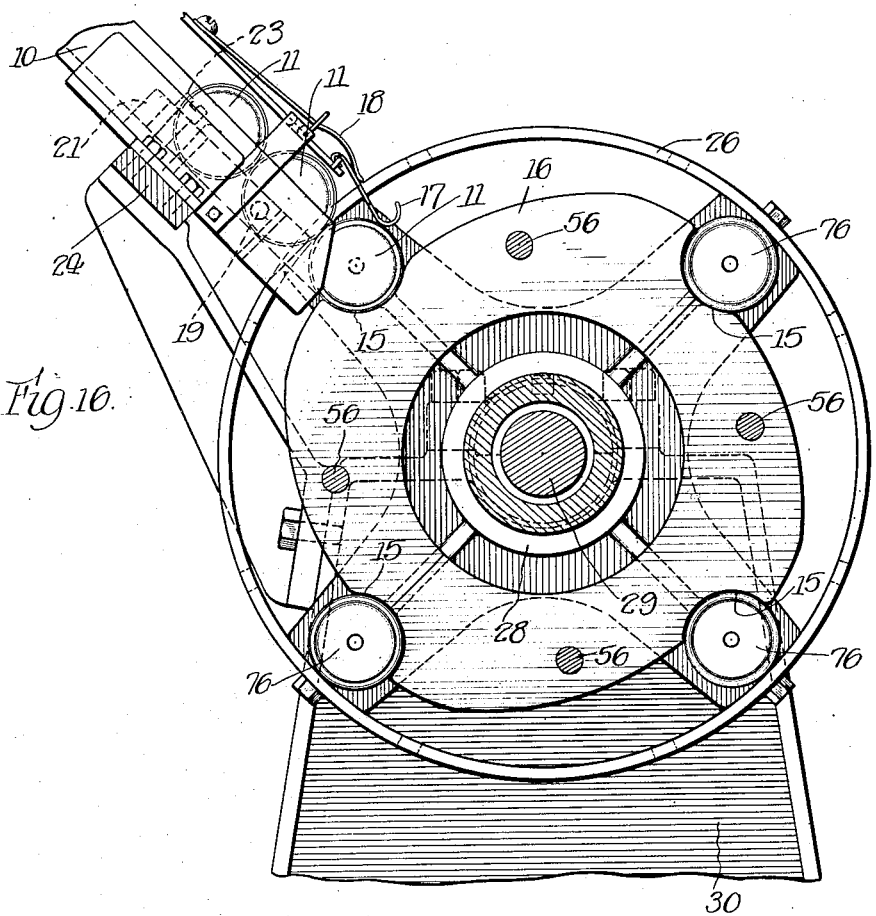
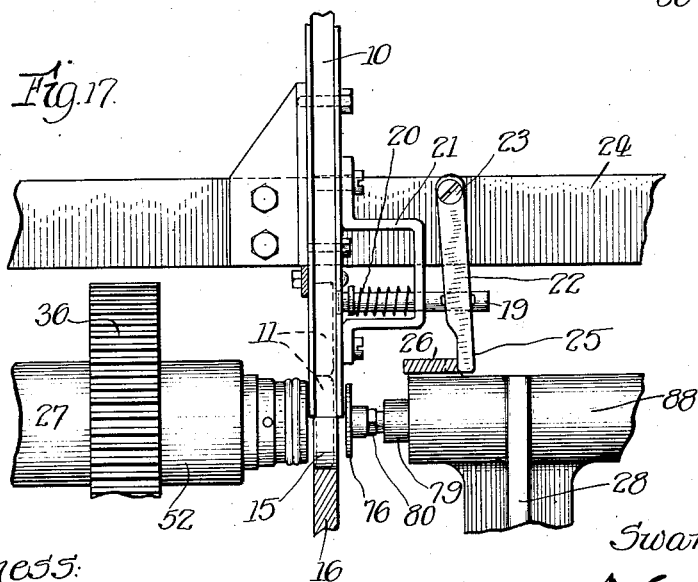

Patented June 29, 1926.

1,590,334

UNITED STATES PATENT OFFICE.

SWAN NILS TEVANDER, OF MAYWOOD, ILLINOIS, ASSIGNOR TO SWAN METALLIC SEAL & CAP COMPANY, A CORPORATION OF ILLINOIS.

BEADING MACHINE FOR CAPS FOR JARS AND CANS.

Application filed June 4, 1923. Serial No. 643,210.

My invention relates to a machine that is adapted to work upon a drawn up cap or cover for a jar, can or other vessel which cap or cover has a side wall or flange which extends over the outside wall of the vessel to be covered and the object of the machine is to put a series of beads into the flange of the cap in the most expeditious and desirable manner possible. The beads are used in sealing the cap to the vessel.

The machine is designed to take the caps that have been previously prepared from a chuteway or suitable source of supply from a hopper in which the caps are deposited and bead the same in a continuous succession requiring only the caps to be supplied in the chuteway of the machine or from a suitable source of supply.

Figure 14:
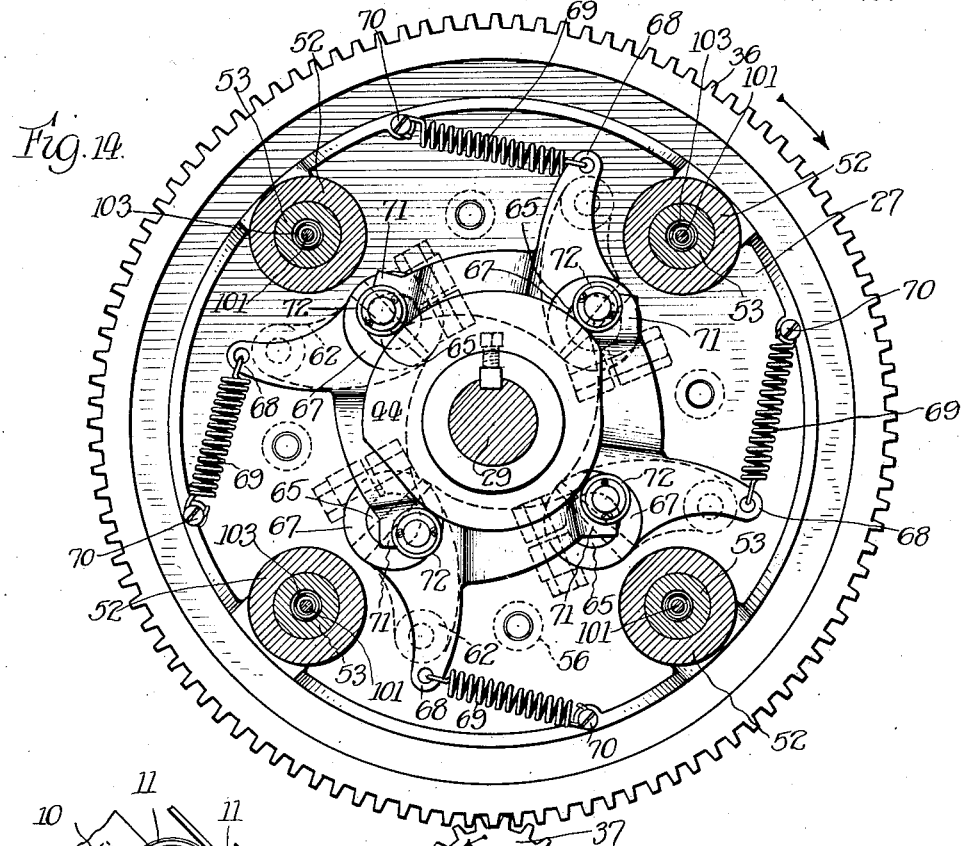
Figure 15:
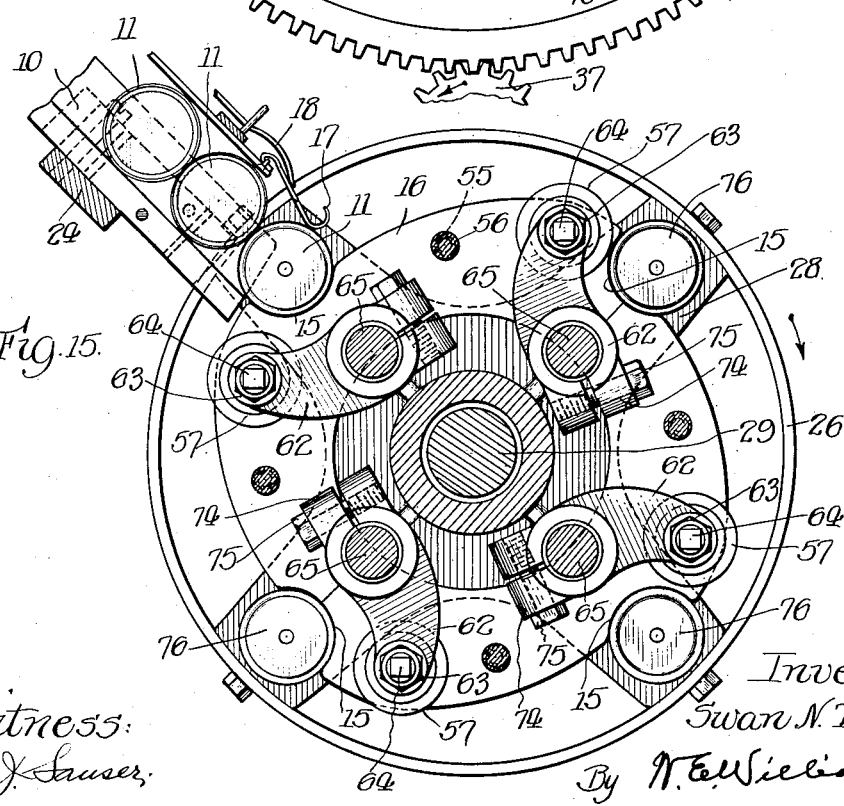

Reference will be had to the accompanying drawings, (7 sheets) in which Figure 1 is a front elevation of the machine. Fig. 2 is a plan view of the machine. Fig. 3 is a plan detail in relation to the chuteway. Fig. 4 is a sectional detail in relation to a cam block. Fig. 5 is a vertical sectional elevation of the upper part of the machine. Fig. 6 is a detail of a bell crank lever. Fig. 7 is an end sectional elevation of the machine on line 7—7 of Fig. 1. Fig. 8 is a sectional view of the cap prepared ready to be operated on by the machine. Fig. 9 is an enlarged sectional view of a portion of the cap shown in Fig. 8 after the latter has been operated upon by the machine. Fig. 10 is a sectional elevation on line 10—10 of Fig. 5, cutting straight across. Fig. 11 is a sectional elevation through the beading heads at the completion of the operation of the beading of the caps. Fig. 12 is a similar view to that of Fig. 11 just prior to the commencement of the beading operation. Fig. 13 is a view of the beading roller spindle. Fig. 14 is a vertical sectional elevation on line 14—14 of Fig. 5. Fig. 15 is a similar view to that of Fig. 14 on line 15—15 of Fig. 5, but jogged in at the left behind the levers or arms 62. Fig. 16 is a section on line 16—16 of Fig. 1. Fig. 17 is a plan detail on an enlarged scale of the chuteway at the delivery end of the same.

It is the function of the machine to change the shape of the cap shown in Fig. 8 to that shown in Fig. 9.

The cap here shown to be operated on is provided with an outer shell of tin or other suitable material indicated by 1 and this shell is lined with paper or other suitable lining indicated by 2.

The cap is provided with flange 3 into which there is to be rolled by the machine the convex beads 5 and 6 joined by the reversely curved bead 7 leaving the portion 8 substantially in its original form as shown in Fig. 8.

The caps prepared as shown by Fig. 8 are supplied to a hopper 9, or any other source of supply may be provided outside of this hopper. Extending from the hopper there is the chuteway 10 down which the caps are fed by the operator from the hopper 9 as indicated by the dotted lines 11 in Fig. 7. In place of the operator feeding the caps 11 into the chuteway 10 they may be delivered into this chuteway in any suitable manner by automatic machinery or otherwise. To insure the delivery of the caps in the right position to be operated on by the machine I provide a detector device, see Fig. 3, composed of a wheel 12 mounted to revolve on a pin 13 and provided with the spokes 14 which extend through a slot in the side of the chuteway 10 and are revolved by the passage of the caps as they roll thru the chute. If the position of the cap is reversed from that shown in Fig. 3 the spokes 14 will engage the top of the cap and prevent the further travel of the caps through the machine until the operator has corrected the fault. The caps roll from the position of the detector wheel 12 down to seats 15 (see Fig. 15) wherein the caps are shown in full lines and indicated by 11, the seat 15 being provided by means of a block 16 mounted to be carried and revolved by the carrier members of the machine.

As the block 16 revolves past the mouth of the chute 10 each seat 15 of the block 16 takes a cap out of the chute 10 and the caps are temporarily sustained in the seats 15 by a finger 17 held in place by a flat spring 18 and this finger 17 springs out of the way and then is replaced by the spring as each and every lower cap comes to the machine. As the lower caps are taken out by the seats 15 at each interval the cap next to it is momentarily held from movement by a clamping pin 19, see Fig. 17, which is automatically pushed to engage the caps in the chute by a spring 20 held in place by a keeper block 21, and the pin 19 is engaged by a lever 22 hinged at 23 to a cross beam 24 of the frame and the outer end 25 of the lever 22 is actuated at suitable intervals by a cam ring 26 whose cam track is such that when it is desired for the caps in the chute to be released for movement into the machine the pin 19 is withdrawn from contact with the caps by the said cam ring 26 thus a continuous supply is intermittently fed to the machine at each interval of the passage of the seats 15 of the block 16.

The major operations of the machine are performed and brought about by the revolution of two head blocks, one of them indicated by 27 and the other by 28 which are mounted to revolve as a single unit upon a fixed shaft 29 which forms a part of the framework of the machine and is fixed into the end posts 30 and 31 and these end posts are further connected across by a frame piece 32.

The block 28 while it is a separate block from the block 27 it is mounted upon the hub of the said block 27 and is firmly secured thereto by the key 33 and set screw 34, see Fig. 5. The block 27 carries a spur gear wheel 36 which is engaged by a pinion 37, see Figs. 1 and 7, on a drive shaft 38 driven by a belt pulley 39 through the medium of a belt 40 and the said pulley 39 is connected to the said shaft 38 through the medium of a clutch 41 which is controlled by a hand lever 42. A hand wheel 43 permits the operation of this shaft 38 by hand as desired. Thus on the revolution of the shaft 38 the head blocks 27 and 28 revolve and carry with them the mechanism connected directly to the said blocks.

Fixed to the said shaft 29 in stationary position there is a cam block 44 which does not revolve but furnishes a cam track for a series of cam rollers which move the beading rollers into and out of their work.

Mounted to revolve upon this shaft 29 there is a gear 45 which engages pinions 46 upon the chuck spindles and upon the hub of the gear 45 there is securely fixed a gear 47 by means of a set screw 48 and key 49 and this gear 47 is driven by an idle gear 50, see Fig. 1, in turn driven by the gear 51 mounted also on the shaft 38 and driven thereby so that while the blocks 27 and 28 revolve in one direction carrying their respective spindles the gear 45 is driven in a reverse direction and thus, as it were, increases the speed of rotation of the pinions 46 on the chuck spindles carried by the block 27.

Mounted in suitable bearings 52 in the block 27 there are carried the chuck spindles 53 upon which the aforementioned pinions 46 are secured and upon the other end of which there is provided a series of chuck or form blocks 54 which are smaller in diameter than the interior of the caps to be operated upon but are provided with the necessary beaded shape to which it is desired to cause the flange of the caps to conform. Thus these chuck blocks 54 through the medium of their spindles 53 and the pinions 46 before described, are continuously revolving at a relatively high rate of speed so long as the machine is in motion.

The carrier block 16 is supported by the screws 55 screwed into the studs 56 which are integral with the block 27, and thus the carrier block 16 becomes, as it were, a unitary part of the block 27 in its revolution.

The flange of the cap is directly operated upon by a series of beading rollers 57 which are shaped to conform to the shapes of the chucks 54 to produce the desired shape of the flange or skirt of the cap, see Figs. 11 and 12, and these beading rollers 57 because of the fact that they revolve rapidly under considerable pressure and by friction are provided with roller bearings 58 mounted on a bearing 59 of a bearing pin 60 which is provided with an eccentric portion 61 secured into a lever arm 62 and fastened therein by the clamping nuts 63. This arrangement of the eccentricity of the bearing portions 59 and 61 of the pins 60 in relation to each other permits an adjustment of the rollers 57 slightly to and from its relationship with the chucks 54, and this is accomplished by revolving the pins 60 by an application of a wrench to the squared portion 64 of the pin 60, and this adjustment is held from displacement by the nuts 63.

The lever arms 62 form one end of the bell crank lever shown in Fig. 6, the arms 62 being connected at one end to the shafts 65 which are mounted in bearings 66 in the block 27. On the other end of the shafts 65 there are the levers 67 which are provided with two arms, one arm 68 being connected to springs 69 fastened at 70 to the block 27 and the other arm 71 carrying rollers 72 and these rollers are all the time held in contact with the cam block 44 thru the influence of the springs 69.

Since the cam block 44 is stationary and the rollers 72 travel around the cam block 44 thus the shape of the said cam block 44 controls the movement of the beading rollers 57 to and from the beading chucks 54 as indicated by the different positions shown by Figs. 10 and 15, and as the caps are mounted on the chuck blocks 54 while the latter is revolved in contact with the rollers 57 the action of the two rollers results in forming the bead on the flange of the cap as desired. The blocks 67 are secured to the shafts 65 by the pins 73, Fig. 5, and the blocks 62 are connected to the shafts 65 by the clamping lugs 74 and screws 75, see Fig. 15.

To properly hold the caps on to chucks 54 there are provided the disk blocks 76 screwed on to the threaded ends 77 of the small shafts 78 carried in the hollow cavity of the rods 79. A jam nut 80 prevents displacement of the disk block 76. A pin 81 in the rod 79 passes through a turned down portion 82 of the shaft 78 and prevents its release from the hollow cavity of the rod 79.

In the end of the shaft 78 there is a small cavity in which there is placed a ball 83 which works against one end of a block 84 also held within the cavity of the rod 79 and this block 84 is held in place by a pin 85 fixed in the rod 79 and sliding in the small slot or cavity 86 in the block 84. A spring 87 works against the other end of the block 84 and thus pushes the shaft 78 with its disk block 76 outward to the limit permitted by the two pins 81 and 85 and thus producing an elastic contact of the disk 76 with the cap on the chuck block 54. The block 84 does not revolve while the small shaft 78 with its disk 76 may or may not revolve depending on the friction between it and the cap on the chuck block 54.

The rods 79 are carried in the guideways 88 of the block 28 and are permitted to slide longitudinally in these guideways but are prevented from revolution by the splines 89.

In one end of each of the rods 79 there is a pin 90 which carries a roller 91 working in the cam track 92 of a fixed cam 93 fixed by the set screw 94 and spline 95 to the frame shaft 29 before described, thus the cam track 92 is stationary and the rollers 91 travel therein as the block 28 revolves and this cam track 92 is so shaped as to move the disks 76 to and from the chuck blocks 54 in a manner to clamp or hold the caps on the said chuck blocks in suitable position.

The finished caps are discharged from the chuck blocks 54 through the service of a cam 96 supported by the stud 97 and bolt 98 fixed into the frame member 31 of the machine, see Figs. 1 and 4. This cam 96 engages in succession the small ends 99 of the rods 100 which slide in the hollow cavities within the spindles 53 of the chuck blocks 54. Ejector rods 101 fixed by the pins 102 into the blocks 100 furnish the contact with the cap, see Fig. 5. Springs 103 push the blocks 100 leftward, retreating the rods 101 at all times save when the cam 96 produces a reverse movement in the act of ejecting the cap. The position whereat the cap is about to be ejected or disengaged from one of the chuck blocks 54 is shown at the lower side of Fig. 5. The movement of the springs 103 is limited by the screw cap 104 screwed over the end of the spindle 53 and working against a shoulder of the block 100. Thus as the spindles 53 with their chucks 54 revolve they revolve this ejector mechanism and it is free at all times excepting at the momentary contact of the ends 99 with the cam 96, when the ends pass by the cam in the act of discharging the caps from the chuck blocks 54, which takes place at the lower side of the machine.

What I claim is:—

1. In a device of the class described, a suitable frame provided with a central circular fixed supporting shaft, revolving blocks adapted to be mounted on and revolve around the said supporting shaft, a series of cam members supported and fixed to the said shaft in stationary positions, revolubly mounted chucks carried by the said revolving blocks, a revolving gear mounted to revolve concentric with the said stationary frame shaft and adapted to drive the said revolving chucks, a series of beading rolls carried by one of the said revolving blocks and arranged to be adjusted to and from the said supporting shaft, a series of clamping disks adapted to be adjusted to and from the said chucks and hold caps thereto, means for discharging caps from the chucks passing through the said spindles of the said chucks; in combination with suitable driving mechanism for the parts and a suitable source of supply for the caps.

2. In a device of the class described, a central fixed supporting shaft, mechanism for beading the caps, a fixed chuteway forming the source of supply for the caps adapted to discharge the caps automatically into receiving pockets in the said beading mechanism, means for intermittently damming off the chuteway supply of caps, a series of revolving chucks adapted to be moved to and away from the said chuteway and simultaneously revolve about their axes, a series of registering carrier pockets adapted to revolve and to receive and hold in position the caps as delivered by the chuteway and hold the same in position to register with the said revolving chucks, a series of clamping devices adapted to clamp the caps onto the said chucks, a series of beading rolls adapted to be moved to and from the said chucks, stationary cams carried by said fixed supporting shaft and adapted to actuate the said beading rolls in their movement to and from the said chucks and to actuate the said clamping devices to and from the said chucks.

3. In a device of the class described, a block adapted to be revolved about a central axis and provided with carrying spindles upon which are mounted chuck blocks, said spindles adapted to be revolved about their own axes as the same are revolved about the axis of the block, a series of rocker shafts carried by the said revolving block, two sets of arms on the said rocker shafts on the ends of one of which are carried pins upon which are mounted beading rollers and on the end of the other there are pins upon which are carried cam rollers, a stationary cam adapted to engage the said cam rollers and thereby move the said beading rollers to and from engagement with the caps carried by the said chuck blocks.

4. In a device of the class described, a fixed main supporting frame shaft, revolving blocks mounted to revolve about the said shaft, said blocks carrying spindle bearings and rod bearings, spindles mounted in the said spindle bearings and chuck blocks mounted upon the said spindles, pinions mounted upon the said spindles, a revolving gear engaging and driving said pinions, means passing through cavities in the said spindles for discharging caps from the said chuck blocks, a fixed cam in the pathway of the said discharging means and adapted to actuate the same at the proper intervals for discharging a cap from the chuck blocks.

5. In a machine of the class described, a central shaft, a revolving member adapted to be revolved about the central shaft of the machine, a series of cap receiving pockets carried by said revolving member, a series of spindles mounted in the said revolving member, a series of chuck blocks carried by said spindles, a chuteway forming the source of supply for the caps to be operated upon in position to discharge caps into said pockets adapted to receive the same and said pockets located adjacent to the said chuck blocks, a series of clamping devices located in alignment with the said chuck blocks and carried around in association therewith, a fixed cam adapted to move the said clamping devices as the same are revolved about the axis of the machine; a series of rocker shafts carrying a series of beading rollers mounted upon said rocker shafts, and said rocker shafts mounted to be carried around in constant association with the said chuck blocks, a fixed cam adapted to control the movement of the said beading rollers to and from the said chuck blocks through the means of said rocker shafts, a gear for revolving the chuck blocks, and means for driving the said gear from a suitable source of power.

6. In a machine of the class described, a central fixed horizontal frame shaft, fixed cam blocks mounted upon the said shaft, revolving carrying spindle blocks mounted to be revolved upon the said shaft, beading chucks and beading rollers carried by the said spindle blocks and said beading rollers moved by one of the said fixed cams, a series of clamping devices for clamping caps to the chucks and moved by one of the said fixed cams, suitable means for driving the parts from a suitable source of power.

7. In a device of the class described, a revolving spindle upon which is mounted a chuck block adapted to hold and revolve a cap in the act of rolling a bead on the flange of the cap, an ejecting device carried within the spindle of the said chuck block composed of two rods, one rod being smaller than the other and having a spring threaded over its body, one end of which abuts against the larger rod and the other end against a wall in the cavity of the spindle, and with means for positively pushing the two rods in the act of ejecting the cap from the chuck, and the said spring restoring the rods to position of retreat.

Signed at Chicago, in the county of Cook, and State of Illinois, this 18th day of April, 1923.

SWAN NILS TEVANDER.